United States Patent [19]
Pettinaroli et al.

[11] Patent Number: 5,467,796
[45] Date of Patent: Nov. 21, 1995

[54] BALL VALVE WITH A STRAINER AND INTEGRATED MEANS FOR FLUSHING THE STRAINER

[75] Inventors: Giuseppe Pettinaroli, Novara, Italy; John C. Sherman, Highland, Mich.

[73] Assignee: Hydronic Components, Inc., Madison Heights, Mich.

[21] Appl. No.: 410,489

[22] Filed: Mar. 24, 1995

[51] Int. Cl.⁶ .................. F16K 5/06; E03B 7/07; B08B 3/04
[52] U.S. Cl. .................. 137/238; 134/166 C; 137/315; 137/547; 137/883; 137/887; 210/409; 251/315.01
[58] Field of Search .................. 137/237, 238, 137/315, 544, 547, 549, 883, 887; 134/166 R, 166 C; 210/409, 411, 445; 251/315.01, 315.16

[56] References Cited

U.S. PATENT DOCUMENTS

| | | | |
|---|---|---|---|
| 229,384 | 6/1880 | Crocker | 137/547 |
| 934,614 | 9/1909 | Huxley | 137/238 |
| 1,590,128 | 6/1926 | Staples | 210/409 |
| 1,977,601 | 10/1934 | Winton | 210/411 |
| 3,525,352 | 8/1970 | Jensen | 137/238 |
| 3,748,837 | 7/1973 | Billeter | 137/549 |
| 3,823,831 | 7/1974 | LeBlanc, Jr. | 210/409 |
| 3,943,959 | 3/1976 | Kirkland | 137/238 |
| 4,478,617 | 10/1984 | Rees | 137/549 |
| 5,181,539 | 1/1993 | Yokoyama | 137/238 |
| 5,188,335 | 2/1993 | Pettinaroli | 251/95 |
| 5,361,801 | 11/1994 | Kerpan et al. | 137/547 |

*Primary Examiner*—George L. Walton

[57] ABSTRACT

A ball valve having a valve body defining a ball valve chamber and having a longitudinal axis defined by inlet and outlet passages. A ball valve element is rotatably disposed in said valve chamber. The ball valve element has a diametrically disposed fluid passage and is operatively connected to a control lever for rotating the ball valve element between a closed position and an open position. A basket strainer is removably mounted in the ball element passage in the ball valve element. The ball valve is provided with an internal pilot fluid flush passage that connects an inlet port to the ball valve chamber, and a pilot fluid flush discharge port and discharge valve that communicate with the ball valve chamber. A flow control plug valve is movably mounted in the internal pilot fluid flush passage for selective allowing or preventing fluid flow therethrough. When the ball valve element is rotated to a closed position, the flow control plug valve may be moved to an open position to allow upstream fluid to flow through the inlet port and internal pilot fluid flush passage and into the ball valve element chamber and through the basket strainer and out the pilot fluid flush discharge port, to reverse flush out debris captured by the basket strainer.

4 Claims, 2 Drawing Sheets

BALL VALVE WITH A STRAINER AND INTEGRATED MEANS FOR FLUSHING THE STRAINER

BACKGROUND OF THE INVENTION

1. Field of the Invention

The field of art to which this invention pertains may be generally located in the class of devices relating to valves, in class 137, Fluid Handling, United States Patent Office Classification, appears to be the applicable general area of art to which the subject matter similar to this invention has been classified in the past.

2. Description of the Prior Art

This invention relates to a quarter-turn flow control ball valve, with an inline basket strainer integrated into the ball of the valve, which is adapted for use in heating, ventilating and air conditioning systems. Heretofore, strainers used in a heating, ventilating and air conditioning system had to be removed from the system line to permit cleaning the strainers, which action involves considerable time and expense. Each HVAC system requires at least two piping connections, and the controls which operate every heat transfer coil are normally protected by a strainer to insure its operation. Normally, this strainer is separated from an isolation valve, and it is difficult to service and flush.

SUMMARY OF THE INVENTION

It is a primary object of the present invention to provide a ball valve for a HVAC system which has integrated therewith an inline basket strainer, and backflush means for flushing the strainer to clean the strainer without removing it from the system line in which the valve is installed.

The basic component of the valve is a quarter-turn valve, which allows the valve to be closed via a handle lever, thus allowing components downstream of the valve to be services. The basket strainer is mounted in the ball valve, and can be serviced without disturbing piping connections or draining the pipe in a heating, ventilating and air conditioning system. The ball valve with an integrated basket strainer reduces the amount of space required to install a ball valve and strainer combination in a heating, ventilating and air conditioning system. The ball valve is provided with an internal pilot line and flush valve, which allows the basket strainer to be reverse flushed without draining the system pipe or removing the strainer basket from the valve, which feature greatly simplifies service of the basket strainer.

Each of the last described functions is typically performed by a separate device in a heating, ventilating and air conditioning system. Each function requires at least two piping connections, and the controls which operate every heat transfer pipe are normally protected by a strainer to insure its operation. Normally the strainer is separate from an isolation valve, and is difficult to service or flush. By combining all of these separate devices into a single valve structure, considerable time is saved in the installation of a heat transfer coil in a heating, ventilation and air conditioning system. In addition, approximately three piping connections are eliminated, thus removing three potential leak points. Also, the ability to flush or remove the basket strainer without draining the pipe greatly simplifies servicing the strainer. In addition, the integrated valve is one-third the installed length of the components it replaces, making the installation of a heat transfer coil much easier in which is typically a very cramped installation space in a heating, ventilating and air conditioning system.

The ball valve of the present invention is provided with an integral pilot line and a plug valve mounted in the pilot line so that when the ball valve is in a closed position, it is possible to open the plug valve in the pilot line, which allows upstream water to flow into the back side of the body cavity of the valve. The valve body is provided with a pilot flush port integrated into the side of the valve, so that when the upstream water is directed into the back side of the body cavity of the valve it then flows through the basket strainer in a reverse manner, and allows the debris captured by the basket strainer to be flushed out through the pilot flush port and out of the system.

DESCRIPTION OF THE PREFERRED EMBODIMENT

Figure 1:
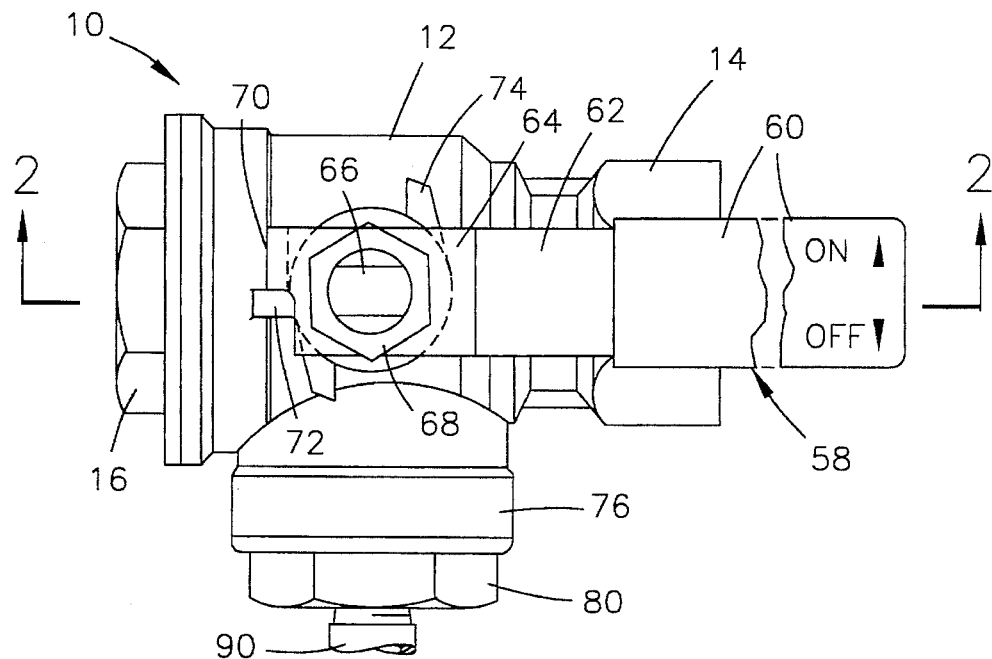
FIG. 1 is a top plan view of a ball valve with a basket strainer and an integrated means for flushing the strainer, made in accordance with the principles of the present invention.
Figure 2:
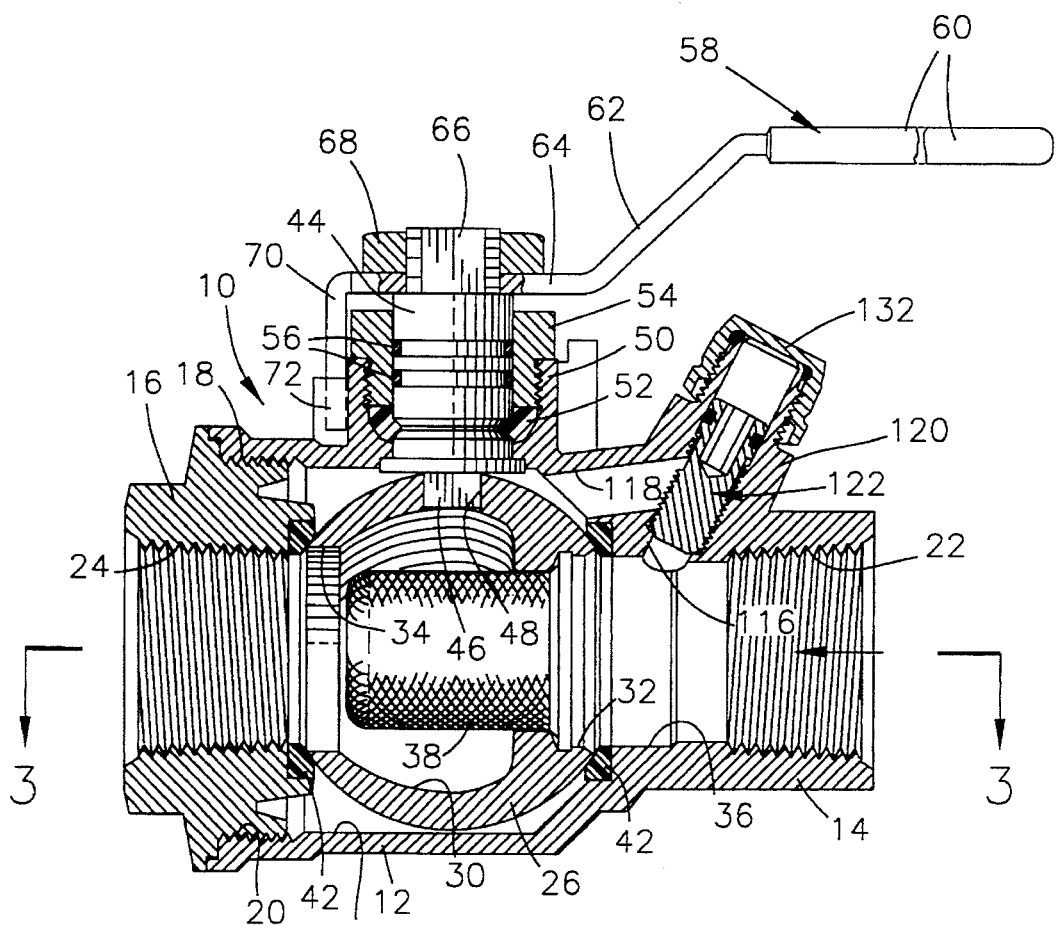
FIG. 2 is a vertical section view of the ball valve illustrated in FIG. 1, taken along the line 2—2 thereof, and looking in the direction of the arrows.

Referring now to the drawings, and in particular to FIGS. 1 and 2, the numeral 10 generally designates a ball valve assembly including a basket strainer and integrated means for flushing the strainer. The integrated ball valve assembly 10 comprises a valve body 12 that is provided on the inlet end thereof with an inlet pipe fitting or nipple 14. The valve body 12 is also provided with an outlet fitting or nipple 16 which is provided with a threaded outer periphery 18 on its inner end. The valve body 12 is provided with an internally threaded outlet 20 into which is threadably received the threaded outer periphery 18 of the inner end of the nipple 16. As shown in FIG. 2, the inlet pipe fitting or nipple 14 is provided with an inlet threaded port 22. The outlet fitting or nipple 16 is provided with an outlet threaded port 24. The numeral 26 designates a flow control quarter-turn ball valve element which is rotatably mounted in a ball valve chamber 28 in the valve body 12. The flow control quarter-turn ball valve element 26 is rotatably mounted on a rotational axis perpendicular to the longitudinal axis of the valve body 12.

As shown in FIG. 2, the ball valve element 26 is provided with a ball valve element passage 30 which communicates with a ball valve element passage inlet 32 and a ball valve element passage outlet 34. An inlet passage 36 in the valve body 12 connects the threaded inlet port 22 in the inlet pipe fitting or nipple 14 with the ball valve inlet 32.

Figure 3:
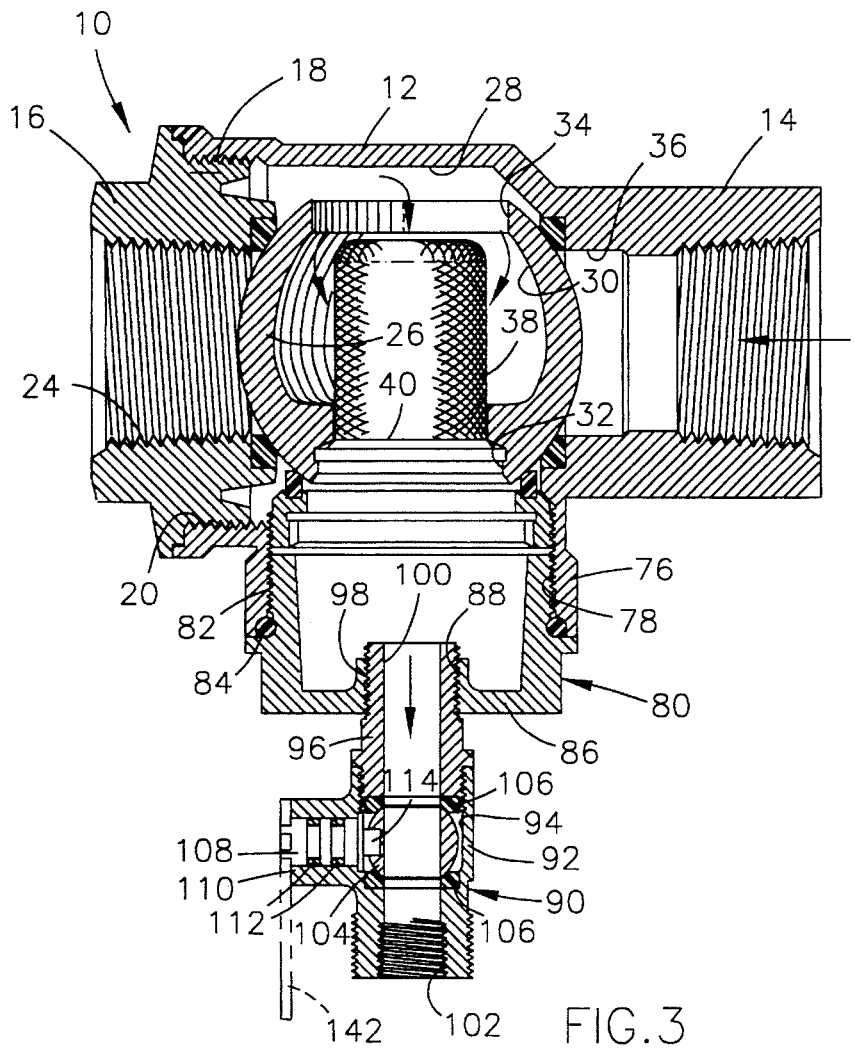
FIG. 3 is a horizontal section view of the ball valve illustrated in FIG. 2, taken along the line 303 thereof, and looking in the direction of the arrows.

As shown in FIG. 3, a basket strainer 38 is operatively mounted in the ball valve element passage 30 and is releasably retained in place by a conventional spring retainer 40. As shown in FIG. 2, the ball valve element 26 is rotatably mounted on a pair of ball valve element seals 42. The ball valve structure 10 includes a conventional ball valve element stem or shaft 44 which has a rectangular end 46 that is operatively mounted in a rectangular slot 48 formed in the ball valve element 26. The ball valve stem or shaft 44 is rotatably mounted within a valve stem hub 50 that is integrally formed on the valve body 12. A conventional packing gland 52 is mounted in the valve stem hub 50 around the lower inner end of the ball valve element stem or shaft 44, and it is operatively engaged by a threaded packing gland nut 54. A pair of suitable O-ring seals 56 are operatively mounted around the periphery of the body of the ball valve element stem or shaft 44 and sealingly engage the inner cylindrical chamber in the packing gland nut 54.

As shown in FIGS. 1 and 2, a control lever, generally indicated by the numeral 58, is provided for rotating the ball valve element 26 between a closed and an open position. As shown in FIG. 2, the control lever 58 includes a handle portion 60 which is integrally connected to a downwardly angled portion 62 that is integral with a flat portion 64. The handle flat portion 64 is provided with an opening therethrough for seating it around the threaded upper end 66 of the ball valve element stem or shaft 44. A conventional control lever nut 68 is threadably mounted on the integral threaded upper end 66 of the ball valve element stem or shaft 44, and it releasably retains the flat portion 64 of the control lever 58 in place. As shown in FIG. 2, the flat portion 64 of the control lever 58 is provided on a free end thereof, with an integral downwardly extended lip 70, which engages an integral stop protrusion 72 on the side of valve stem hub 50, when the control lever 58 is in the open position shown in FIGS. 1 and 2, and the ball valve element 26 is in the full flow open position. When the control lever 58 is rotated clockwise for 90 degrees, from the position shown in FIG. 1, the control lever lip 70 engages a control lever stop 74 protrusion which is integrally formed on the valve body 12.

As shown in FIG. 3, the ball valve 10 is provided with an integral strainer outlet flush fitting 76 which is provided with an internal threaded cylindrical chamber 78. A strainer outlet flush fitting access cap, generally indicated by the numeral 80, is provided with a threaded outer end periphery 82 that is threadably mounted in the threaded bore 78 of the strainer outlet flush fitting 76. A suitable O-ring seal 84 is operatively mounted between the strainer outlet flush fitting 76 and the strainer outlet flush fitting access cap 80.

The strainer outlet flush fitting access cap 80 is provided with a transverse outer end wall 86 which is provided with an axial threaded outlet port 88. A strainer flush discharge or pilot valve, generally indicated by the numeral 90, is operatively mounted in the threaded outlet port 88 in the outer end wall 86 of the strainer outlet flush fitting access cap 80.

The strainer flush discharge pilot valve 90 includes a tubular valve body 92 and an inlet conduit 96 which has its inner threaded end 98 threadably mounted into the threaded outlet pilot port 88 in the access cap 80. The discharge pilot valve 90 includes a valve body chamber 94 which communicates with an inlet passage 100 in the conduit 96. The discharge valve body chamber 94 also communicates with a threaded outlet passage 102 formed in the discharge valve body 92. A discharge pilot ball valve element 104 is mounted in the valve chamber 94 and is rotatably mounted on a pair of circular seals 106. A conventional ball valve stem 108 is rotatably mounted in an integral hub 110 formed on the side of the discharge pilot valve body 92 and it is provided with a pair of conventional ball valve stem seals 112. The ball valve stem 108 is provided with a conventional square end 114 that is seated in a mating square hole in the ball valve element 104. The ball valve stem 108 is shown in FIG. 3 in a position with the ball valve element 104 in an open position. The ball valve stem 108 may be rotated 90 degrees by an suitable means, whether it be any suitable wrench or by a conventional control lever indicated in broken lines by the numeral 142, to turn the ball valve element 104 ninety degrees to a closed position.

As shown in FIG. 2, the ball valve 10 is provided with an internal pilot fluid or flush passage 116 that communicates with the inlet passage 36 and inlet port 22 in the valve body 12. The pilot fluid flush passage 116 communicates with a second pilot fluid flush passage 118, which in turn communicates with the ball valve body chamber 28 in the ball valve body 12.

Figure 4:
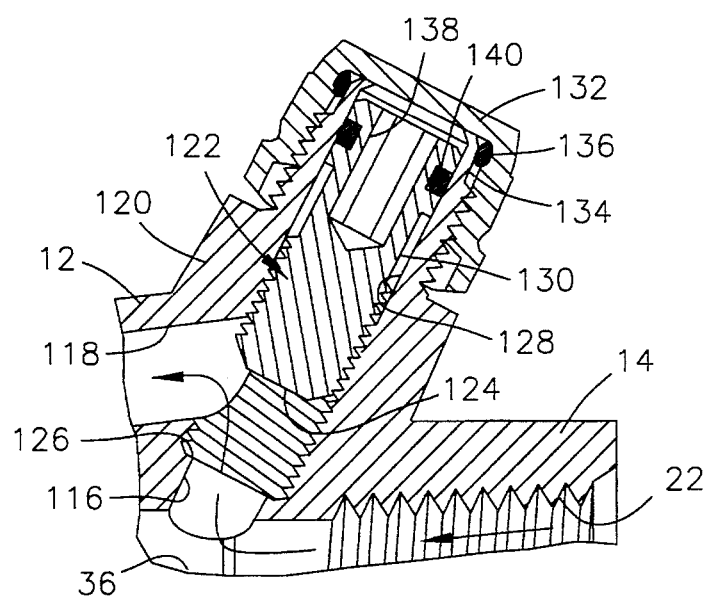
FIG. 4 is a fragmentary, enlarged section view of the plug valve employed in the pilot flush line for allowing upstream water to flow into the back side of the body cavity of the valve body.

As best seen in FIG. 4, the ball valve body 12 is provided with an integral tubular extension 120 in which is movably mounted a strainer fluid flush flow control plug valve, generally designated by the numeral 122. The strainer fluid flush flow control valve 122 is shown in FIG. 4 in a retracted or open position, to allow incoming upstream fluid to flow through the pilot fluid flush passages 116 and 118 into the ball valve chamber 28 in the ball valve body 12. A valve seat 126 is formed at the outlet end of the pilot fluid flush passage 116, for seating engagement with the valve nose 124 on the strainer fluid flush flow control plug valve 122. When the plug valve 122 is moved into the closed position as shown in FIG. 2, fluid flow is blocked between the pilot fluid flush passages 116 and 118. As shown in FIG. 4, the outer periphery of the plug valve 122 is threaded, as indicated by the numeral 130, and it threadably engages the threaded bore 128 in the valve body tubular extension 120. The outer end of the threaded bore 128 in the plug valve body tubular extension 120 is normally enclosed in normal use of the ball valve 10 by an internally threaded closure cap 132 that is threadably mounted on the threaded periphery of the outer end 134 of the valve body tubular extension 120. The closure cap 132 is provided with a suitable O-ring seal 136. As shown in FIG. 4, the outer end of the strainer fluid flush flow control plug valve 122 is provided with an Allen wrench shaped, axial recess 138 for the reception of an Allen wrench to rotate the strainer fluid flush flow control plug valve 122 between the open position shown in FIG. 4, and the closed position shown in FIG. 5. A suitable O-ring seal is mounted around the outer periphery of the strainer fluid flush flow control plug valve 122.

What is claimed is:

1. A ball valve (10) comprising a valve body (12) having a valve chamber (28), inlet (22) and outlet (24) ports communicating with said valve chamber (28), a rotatable ball valve element (26) disposed within the valve chamber (28) and movable between a valve open position and a valve closed position, said ball valve element (26) including means (30,32,34) defining a passage therethrough, said passage (30) defining inlet and outlet portions (32,34) therein that are in fluid alignment with said inlet and outlet ports (22,24) when said valve is in said open position, a basket strainer (38) removably mounted in the ball valve element (26) between said inlet and said outlet portions (32,34) of said passage (30) said ball valve element (26) having a rotatable shaft (44) for rotating the ball valve element (26) between said valve open position and said valve closed position, a control lever (58) connected to the ball valve element (26) rotatable shaft (44), said control lever (58) having a downwardly depending lip (70) at the end thereof for engaging stop protrusions (72,74) integrally formed on the valve body (12) when the ball valve element (26) in said open and closed positions, respectively, characterized by:

(a) an internal pilot fluid flush passage means (116,118) is located in a portion of the valve body (12) at said inlet port (22) and connects the inlet port (22) with the ball valve element chamber (28);

(b) a fluid flow control plug valve (122) is movably mounted in the pilot fluid flush passage means (116, 118) between said inlet port (22) and said valve chamber (28), and is movable between selective open and closed positions to allow and prevent fluid flow through the pilot fluid flush passage means (116,118);

(c) a pilot fluid flush discharge port (88) is formed in said ball valve body (12) and communicates with the ball valve element chamber (28); and, (d) a pilot fluid flush discharge valve (90) is connected to said pilot fluid discharge port (88), whereby when the ball valve element (26) is rotated to a closed position, and the fluid flow control plug valve (122) and the pilot fluid flush discharge valve (90) are moved to open positions, the upstream fluid entering the inlet port (22) will flow through the internal pilot fluid flush passage means (116,118) into the ball valve element chamber (28) through said outlet portion (34) of said passage (30) and flow through the basket strainer (38) and out the pilot fluid flush discharge valve (90), to reverse flush out debris captured by the basket strainer.

2. A ball valve as defined in claim 1, wherein:

(a) the outlet port (24) is located in an outlet nipple (16) that is threadably attached to the ball valve body (12) and is removable to permit removable of the basket strainer (38) from the ball valve element (26).

3. A ball valve as defined in claim 1, wherein:

(a) the ball valve body (12) has a longitudinal axis aligned with the axis of the inlet and outlet ports (22,24), and the fluid flow control plug valve (122) is located on an axis that is disposed at an acute angle relative to said ball valve body longitudinal axis.

4. A ball valve as defined in claim 1, wherein:

(a) the pilot fluid flush discharge valve (98) comprises a ball valve (104).

* * * * *